(12) United States Patent
Jewett et al.

(10) Patent No.: US 9,725,967 B2
(45) Date of Patent: Aug. 8, 2017

(54) CENTRALIZERS FOR CENTRALIZING WELL CASINGS

(71) Applicant: BP Corporation North America Inc., Houston, TX (US)

(72) Inventors: Scott E. Jewett, Irvine, CA (US); David G. Duckworth, Irvine, CA (US)

(73) Assignee: BP CORPORATION NORTH AMERICA INC., Naperville, IL (US)

( * ) Notice: Subject to any disclaimer, the term of this patent is extended or adjusted under 35 U.S.C. 154(b) by 257 days.

(21) Appl. No.: 14/338,620

(22) Filed: Jul. 23, 2014

(65) Prior Publication Data

US 2015/0027684 A1    Jan. 29, 2015

Related U.S. Application Data

(60) Provisional application No. 61/858,603, filed on Jul. 25, 2013.

(51) Int. Cl.
  *E21B 17/10*   (2006.01)
  *E21B 47/12*   (2012.01)
  (Continued)

(52) U.S. Cl.
  CPC ...... *E21B 17/1028* (2013.01); *E21B 17/1078* (2013.01); *E21B 47/122* (2013.01);
  (Continued)

(58) Field of Classification Search
  USPC ...................................... 166/60, 65.1, 241.6
  See application file for complete search history.

(56) References Cited

U.S. PATENT DOCUMENTS

| | | |
|---|---|---|
| 2,812,025 A | 11/1957 | Teague et al. |
| 3,746,092 A | 7/1973 | Land |

(Continued)

FOREIGN PATENT DOCUMENTS

| | | |
|---|---|---|
| CN | 2760028 Y | 7/2004 |
| CN | 2720087 | 8/2005 |

(Continued)

OTHER PUBLICATIONS

US 6,966,371, 11/2005, Gremillion (withdrawn)
PCT International Search Report dated Mar. 17, 2016.
PCT International Search Report dated Nov. 19, 2014.

*Primary Examiner* — Taras P Bemko
(74) *Attorney, Agent, or Firm* — BP America Inc.

(57) ABSTRACT

A centralizer for centralizing a pipe downhole in a well is provided. The centralizer includes a plurality of arcuate cuffs having first and second ends. The cuffs are affixed adjacent to the pipe's exterior wall, and positioned circumferentially adjacent around the pipe. The cuffs are flexible so as to be positioned in a first condition wherein the cuffs are retracted radially inward so as to be substantially flat against the pipe's exterior wall. The centralizer includes a lock for maintaining the cuffs substantially flat against the pipe's exterior wall until the centralizer has been transported downhole. Further, the centralizer includes an actuator for unlocking the lock so as to allow the cuffs to expand radially outward to form a loop wherein the loop has a central axis parallel to pipe's longitudinal axis. Preferably, the centralizer includes a collar causing the cuffs to all expand or retract together.

18 Claims, 14 Drawing Sheets

(51) Int. Cl.
  *E21B 47/14* (2006.01)
  *G01B 21/22* (2006.01)
  *G06F 3/01* (2006.01)
  *G06F 3/03* (2006.01)
  *G06F 3/0346* (2013.01)

(52) U.S. Cl.
  CPC .............. *E21B 47/14* (2013.01); *G01B 21/22* (2013.01); *G06F 3/017* (2013.01); *G06F 3/03* (2013.01); *G06F 3/0346* (2013.01)

(56) References Cited

U.S. PATENT DOCUMENTS

| | | |
|---|---|---|
| 3,939,356 A | 2/1976 | Loane |
| 4,239,974 A | 12/1980 | Swander et al. |
| 4,531,582 A | 7/1985 | Muse et al. |
| 4,545,436 A | 10/1985 | Harrison |
| 4,587,773 A | 5/1986 | Valencia |
| 4,589,484 A | 5/1986 | Doherty et al. |
| 4,776,397 A | 10/1988 | Akkerman |
| 5,095,981 A | 3/1992 | Mikolajczyk |
| 5,097,905 A | 3/1992 | Goodwin |
| 5,228,518 A | 7/1993 | Wilson et al. |
| 5,261,488 A | 11/1993 | Gullet et al. |
| 5,358,039 A | 10/1994 | Fordham |
| 5,379,838 A | 1/1995 | Wilson et al. |
| 5,575,333 A | 11/1996 | Lirette et al. |
| 6,376,925 B1 | 4/2002 | Galich |
| 6,435,275 B1 | 8/2002 | Kirk et al. |
| 6,457,519 B1 | 10/2002 | Buytaert |
| 6,515,592 B1 | 2/2003 | Babour et al. |
| 6,561,271 B2 | 5/2003 | Baugh et al. |
| 6,564,870 B1 | 5/2003 | Grigsby et al. |
| 6,725,939 B2 | 4/2004 | Richard |
| 6,727,827 B1 | 4/2004 | Edwards et al. |
| 6,871,706 B2 | 3/2005 | Hennessey |
| 6,891,481 B2 | 5/2005 | Dubinsky et al. |
| 6,894,499 B2 | 5/2005 | Dumont et al. |
| 6,996,937 B2 | 2/2006 | Halloran |
| 7,043,904 B2 | 5/2006 | Newman |
| 7,059,428 B2 | 6/2006 | Frey et al. |
| 7,082,997 B2 | 8/2006 | Slack |
| 7,096,939 B2 | 8/2006 | Kirk et al. |
| 7,104,318 B2 | 9/2006 | Hendrie |
| 7,140,431 B2 | 11/2006 | Betts |
| 7,143,825 B2 | 12/2006 | Pointing |
| 7,377,325 B2 | 5/2008 | Trinder et al. |
| 7,503,398 B2 | 3/2009 | LoGiudice et al. |
| 7,528,528 B2 | 5/2009 | Zanella et al. |
| 7,624,798 B2 | 12/2009 | Presslie et al. |
| 7,690,437 B2 | 4/2010 | Guillot et al. |
| 7,730,941 B2 | 6/2010 | Abarca et al. |
| 7,770,331 B2 | 8/2010 | Halloran |
| 7,775,272 B2 | 8/2010 | Nelson et al. |
| 7,857,063 B2 | 12/2010 | Thornton |
| 7,878,241 B2 | 2/2011 | Buytaert et al. |
| 7,911,075 B2 | 3/2011 | Pagliasotti |
| 8,141,631 B2 | 3/2012 | Chouzenoux et al. |
| 8,196,654 B2 | 6/2012 | Buytaert et al. |
| 8,235,109 B2 | 8/2012 | Vaeth et al. |
| 8,360,161 B2 | 1/2013 | Buytaert et al. |
| 2002/0112853 A1* | 8/2002 | Buytaert .............. E21B 17/1028 166/241.6 |
| 2003/0024710 A1* | 2/2003 | Post .................... E21B 17/1014 166/382 |
| 2006/0255663 A1 | 11/2006 | Vlad |
| 2007/0114018 A1 | 5/2007 | Brezinski et al. |
| 2009/0025929 A1 | 1/2009 | Buytaert et al. |
| 2010/0038076 A1 | 2/2010 | Spray et al. |
| 2010/0175888 A1 | 7/2010 | Buytaert et al. |
| 2011/0168388 A1 | 7/2011 | Linaker |
| 2012/0119510 A1 | 5/2012 | Herzen et al. |
| 2012/0211221 A1 | 8/2012 | Mills et al. |
| 2012/0227959 A1 | 9/2012 | Buytaert et al. |
| 2012/0279725 A1 | 11/2012 | O'Connor |
| 2013/0020909 A1 | 1/2013 | Kim et al. |
| 2013/0087334 A1 | 4/2013 | Buytaert et al. |
| 2013/0174725 A1 | 7/2013 | Heindl |

FOREIGN PATENT DOCUMENTS

| | | |
|---|---|---|
| CN | 202255487 U | 9/2011 |
| DE | 102007034109 | 1/2009 |
| EP | 2158379 | 12/2011 |
| GB | 2242457 A | 10/1991 |
| JP | 2012247355 A | 5/2011 |
| KR | 100717896 B1 | 5/2007 |
| WO | 03006789 | 1/2003 |
| WO | 2013135297 | 9/2013 |

\* cited by examiner

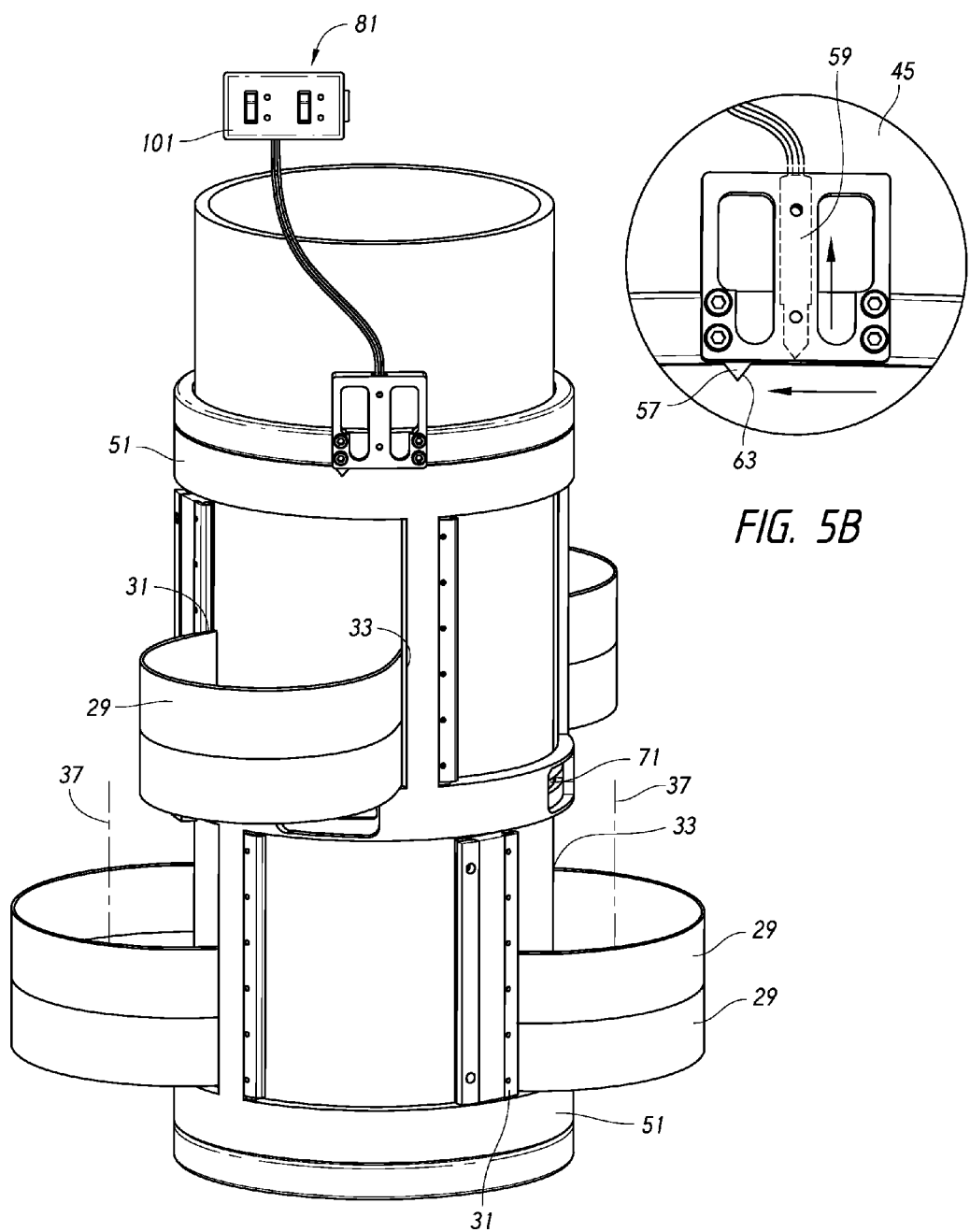
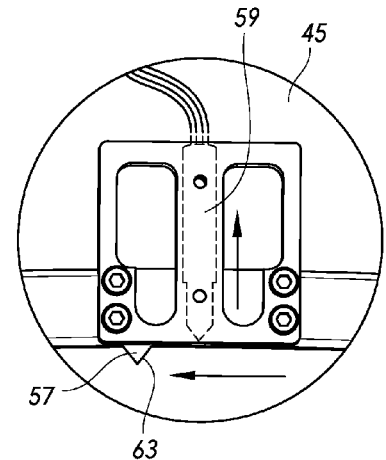
FIG. 5B
FIG. 5A

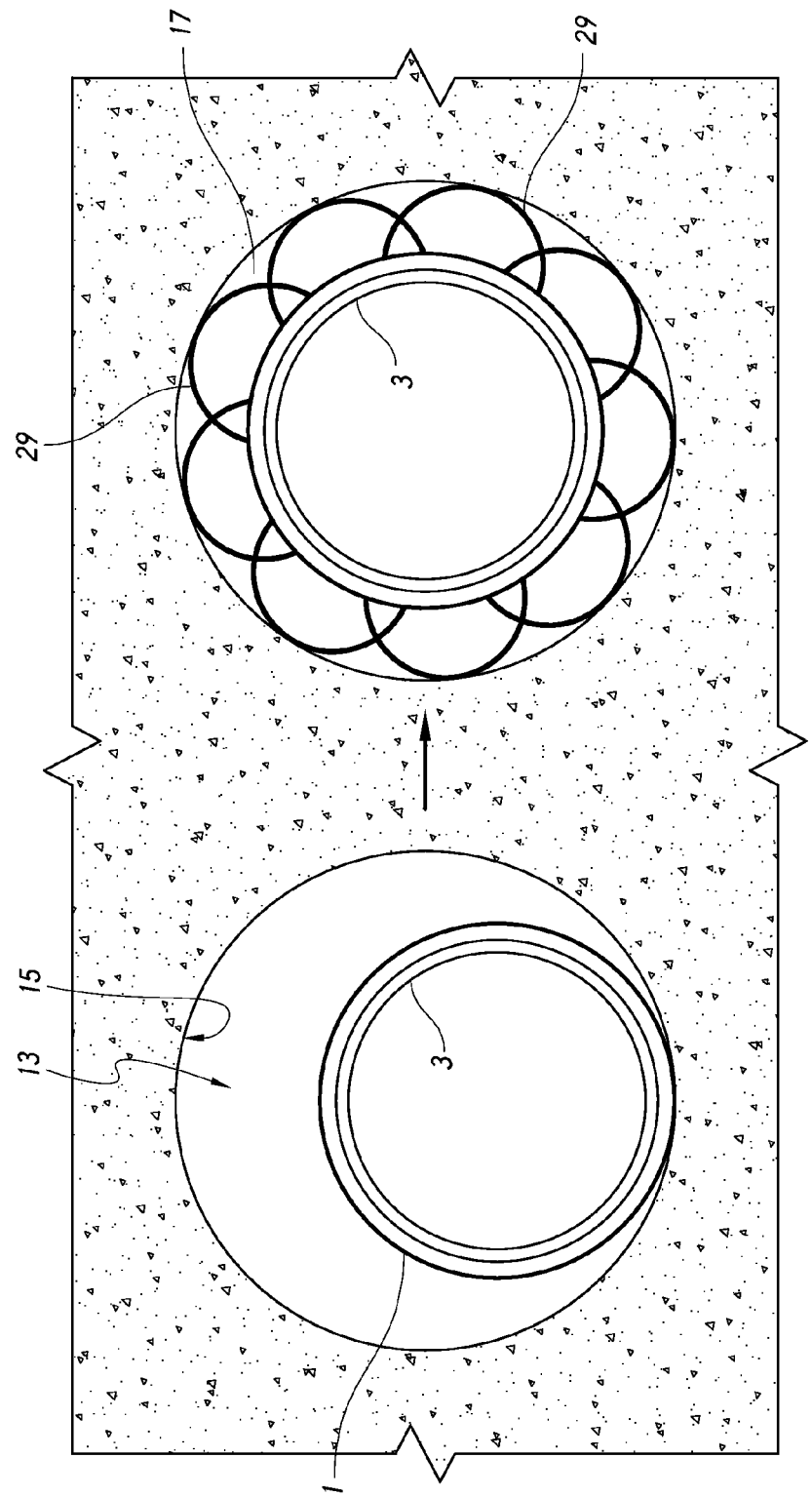

CENTRALIZERS FOR CENTRALIZING WELL CASINGS

CROSS-REFERENCE TO RELATED APPLICATIONS

This application claims the benefit of U.S. Provisional Patent Application Ser. No. 61/858,063 filed on Jul. 24, 2013, which is hereby incorporated herein by reference in its entirety.

BACKGROUND

This disclosure relates generally to the construction of subterranean wells. More particularly, this disclosure relates to methods and apparatus for centering a casing within a well, particularly an oil or gas well. Still more particularly, this disclosure relates to methods and apparatus for centering a casing within an oil and gas well such that cement can be evenly distributed within the annulus disposed between the casing to enable zonal isolation (i.e. no fluid or gas migration).

A well is a subterranean boring from the Earth's surface that is designed to find and acquire liquids or gases. Wells for acquiring oil are termed "oil wells". A well that is designed to produce mainly gas is called a "gas well". Typically, wells are created by drilling a bore, typically 5 inches to 40 inches (12 cm to 1 meter) in diameter, into the earth with a drilling rig that rotates a drill string with an attached bit. After the hole is drilled, sections of steel pipe, commonly referred to as "casings" and which are slightly smaller in diameter than the borehole, are dropped "downhole" into the bore for obtaining the sought after liquid or gas.

The difference between the diameter of the wellbore and the outer diameter of the casing results in an annular space therebetween. When completing oil and gas wells, it is desirable to seal the annular space with cement. The cement is pumped into the annular space, replacing the drilling mud therein. Once the annular space is filled with cement, the cement is allowed to harden to seal the well. To properly seal the well, the casing is preferably positioned so that it is in the middle or center of the wellbore such that the annular space has a constant or substantially constant radial width moving circumferentially about the casing. The casing and cement provide structural integrity to the newly drilled wellbore and provide isolation of high pressure zones. Thus, centralizing a casing inside the annular space is facilitates a reliable seal, and thus good zonal isolation. With the advent of deeper wells and horizontal drilling, centralizing the casing has become more important, yet more difficult to accomplish.

A traditional method to centralize a casing is to attach centralizers to the casing prior to its insertion into the annular space. Most traditional centralizers have tabs, wings or bows that exert force against the inside of the wellbore to keep the casing somewhat centralized. The centralizers are commonly secured at intervals along a casing string to radially offset the casing string from the sidewall of a borehole in which the casing string is positioned. Centralizers center the casing string within the borehole to provide a generally continuous annulus between the casing string and the sidewall of the borehole. This positioning of the casing string within a borehole promotes uniform and continuous distribution of cement slurry around the casing string. Uniform cement slurry distribution results in a cement liner that reinforces the casing string, isolates the casing from corrosive formation fluids, prevents unwanted fluid flow between penetrated geologic formations, and provides axial strength. In general, 100% standoff is achieved once the casing is radially centralized within the borehole or the annulus with the previous casing.

A bow-spring centralizer is the most common type of centralizer. It employs flexible bow-springs to provide offset between the casing and wellbore sidewall. Bow-spring centralizers typically include a pair of axially-spaced and generally aligned circular collars that are coupled by multiple bow-springs. The bow-springs expand outwardly from the collars to engage the borehole sidewall to center a pipe received axially through the collars. Configured in this manner, the bow-springs provide stand-off from the borehole, and flex inwardly as they encounter borehole obstructions, such as tight spots or protrusions into the borehole, as the casing string is installed into the borehole. Elasticity allows the bow-springs to spring back to substantially their original shape after passing an obstruction to maintain the desired stand-off between the casing string and the borehole. Examples of such bow springs are disclosed in U.S. Pat. No. 4,545,436 and Great Britain Patent No. 2242457 which both disclose casing centralizers having a plurality of bows springs which are connected to first and second collars. The collars surround the well casing, and one or both of the collars slide longitudinally upon the pipe when the bow spring is deformed upon engaging the well bore sidewall.

The use of bow-spring centralizers presents a number of disadvantages and their installation can be problematic. To achieve the desired centralization, bow centralizers are designed so that, prior to installation. the bow-springs extend beyond the inside diameter ("ID") of the wellbore. The larger diameter of said bow-springs requires them to be retracted from the force of pushing it down inside the casing or wellbore. This causes kinetic friction when slid down the hole (requiring running force) and also static friction when engaging restrictions or obstructions (requiring starting force). This friction can sometimes prevent the casing from getting to the desired depth. Further, the radial configuration of the bow-springs causes the spring force of one bow-spring to be counteracted by the bow-springs on the opposite side of the casing. This results in a restoring force that diminishes as the casing approaches center, thereby making better centralization require greater and greater spring forces. Furthermore, increased spring forces also increases running and starting resistance. Therefore, a balance is sought between the needed forces to sufficiently centralize the casing and the increased resistance that these spring forces create. A further disadvantage of the bow spring centralizers can arise in wells where the open hole is under-reamed (i.e. the hole is larger than the previous casing shoe). In such cases, centralization is particularly difficult as the bows have to collapse through the restriction and expand sufficiently to centralize the casing in larger open hole.

Yet another disadvantage of bow spring centralizers is that the bow springs obstruct the pumping of cement downhole. After being positioned downhole, the bow springs project radially outward from the casing like spokes to engage the well bore's cylindrical wall. These bow springs can block the proper downward flow of the cement slurry or can create voids in the annular cement structure.

Various attempts have been made to develop centralizers that overcome some of these problems. U.S. Pat. No. 6,871,706 discloses a centralizer that requires the bending of a retaining portion of the collar material into a plurality of aligned openings, each to receive one end of each bow-spring. This requires that the coupling operation be performed in a manufacturing facility using a press. The collars of the centralizer are cut with a large recess adjacent to each set of aligned openings to accommodate passage of a bow-spring that is secured to the interior wall of the collar. Unfortunately, the recess substantially decreases the mechanical integrity of the collar due to the removal of a large portion of the collar wall to accommodate the bow-springs.

U.S. Patent Publication 20120279725 and U.S. Pat. No. 7,857,063 describe centralizers that have a minimal radial expansion prior and during the casing's transportation downhole. Only after the casing is in place are the centralizer tabs expanded radially outward. This reduces the amount of friction that the casing string encounters as it is dropped downhole. Furthermore, the tabs extend laterally relative to the pipe's central axis in a manner that minimizes the obstruction to the flow of cement as it poured downhole. Unfortunately, these centralizers are not suitable for traditional metal well casings that provide minimal radial expansion. Instead, the centralizers are useful only for centralizing tubular members capable of substantial expansion so as to force the centralizer tabs to engage the borehole wall.

Thus, there is a significant need for an improved casing centralizer that provides reduced friction as the centralizer is transported downhole.

There is also a need for an improved casing centralizer that provides increased centralizing force for maintaining a casing in the center of a well bore.

Still there is an additional need for an improved casing centralizer that provides minimal impedance to the flow of cement as cement is pumped downhole in the annular space between the casing string and the well bore wall.

Advantageously, the improved centralizer would provide reduced manufacturing and installation costs, and provide an improved ease of running the casing string downhole into the well bore.

BRIEF SUMMARY OF THE DISCLOSURE

Embodiments disclosed herein address the aforementioned disadvantages by providing an improved centralizer for centralizing a pipe downhole in a well. In general, embodiments of centralizers described herein can be integrated into the pipe so as to include the pipe's cylindrical exterior sidewall and central conduit which defines the pipe's longitudinal axis. Alternatively, the centralizer can include a structure, such as a circular band, for affixing to a pipe, such as for affixing to a pipe immediately prior to the pipe being transported downhole into a well.

At least one embodiment of a centralizer described herein includes a plurality of cuffs. The cuffs are preferably made from metal, which preferably is a traditional spring steel to provide flexibility but also to store substantial mechanical spring energy. The lengths and thicknesses of the cuffs can be determined by those skilled in the art depending on the amount of space desired between the casing and wellbore, the weight and diameter of the casing, and the amount of force needed to be exerted by the cuffs.

The cuffs radially extend in an arcuate manner from the pipe. More specifically, each cuff includes first and second ends affixed adjacent to a pipe's cylindrical exterior wall in a manner that forms a loop having an opening defining a central axis. Each cuff is affixed so as to align the loop's central axis to be parallel to the pipe's central conduit. By providing the loop having an axis parallel to the pipe's central conduit, the centralizer minimizes any obstruction to the flow of cement downhole. The centralizer may include any number of cuffs. However, it is preferred the centralizer includes at least two cuffs and that the cuffs are evenly spaced around the pipe and circumferentially positioned next to each other forming a flower-like pattern. Thus, a centralizer having two cuffs preferably has the cuffs positioned 180° from one another. A centralizer having three cuffs has the cuffs positioned 120° around the pipe, etc. etc.

Of importance, the arcuate cuffs are capable of being retracted prior to the centralizer being positioned downhole, and expanded radially outward after the centralizer has been positioned downhole in a well. Each cuff's first end is affixed to the pipe's exterior wall. The cuff's first end may be affixed to the pipe's exterior wall by any fastener construction known to those skilled in the art including welding, threaded fasteners, rivets, or flanges. Meanwhile, each cuff's second end is selectively affixed adjacent to the pipe's exterior wall in a manner that the cuff's second end is allowed to move circumferentially upon the pipe's exterior wall from a first position wherein the cuff is flexed to form a partially circular shape which is substantially flat against the pipe's exterior wall to a second position wherein the center of each of the cuff's extend radially outward so that the cuff forms a loop shape.

Moreover, the centralizer includes a lock for locking the cuffs in a radially retracted condition wherein the cuffs are flexed to be substantially flat against the pipe's exterior wall. When a lock is selectively unlocked, a cuff's second end is free to move circumferentially around the pipe. Importantly, the cuffs are constructed in the manner of leaf springs to store mechanical spring energy when compressed flat against a pipe's exterior wall. When the lock is released and the cuff's second ends are free to move circumferentially around the pipe, the mechanical spring energy is released allowing the cuffs to spring back into a condition wherein each cuff expands radially outward to form a loop.

The lock may be constructed in various manners known to those skilled in the art for selectively locking the cuffs' second ends adjacent to the pipe's exterior wall at a distance from the cuffs' first end. Moreover, the centralizer includes an actuator for selectively unlocking the lock only after a pipe has been positioned downhole in a well. Numerous actuators for selectively unlocking the lock can also be devised by those skilled in the art. Examples of suitable locks include simple pins which can be retracted using servo-motors or the like. Another example is to actuate locking pins using a release system that is actuated by converting the pressure-expansion of the casing into a mechanical unlocking device. Alternatively, bolts can be utilized which can be disengaged using motors or pyrotechnic bolt cutters. Alternatively, the cuffs may be locked in place utilizing a cylindrical hollow housing having a shape similar to a pipe with open ends for covering and maintaining the cuffs in a retracted condition. To release the cuffs, the housing is simply moved longitudinally in a telescopic manner relative to the pipe to allow the cuffs to expand. This can be accomplished using motors or springs, or other constructions as can be determined by those skilled in the art.

Moreover, though not preferred, separate locks may be provided to each cuff so that each cuff can be controlled to expand individually without affecting other cuffs. However, as explained in greater detail below, it is preferred that the centralizer cuffs are connected so as to be radially compressed together and radially expanded together.

In at least one embodiment, the centralizer includes a collar which circumferentially surrounds the pipe and is capable of rotation about the pipe. The collar affixes to each of the plurality of cuffs second ends so that each of the cuff's second ends rotate together about the pipe. Thus, when one cuff has been retracted radially inward to a compressed condition so as to be substantially flat against the pipe's exterior wall, all other cuffs of the centralizer are also compressed radially inward to a compressed condition. Conversely, when the collar has rotated so that a first cuff has expanded to a second condition wherein the first cuff forms a loop, all other cuffs must also expand radially outward to form loops. Again, various collar constructions may be designed by those skilled in the art. In a preferred embodiment, the collar is a hollow cylinder including a plurality of sidewall openings for allowing the plurality of cuffs to expand radially. The collar may affix to the cuff's second ends utilizing various fasteners known to those skilled in the art including threaded fasteners, welding or rivets. In a preferred embodiment, the collar affixes to the cuffs' second ends by a simple flange construction.

To retract the cuffs into a compressed radially inward condition, the collar is rotated relative to the pipe so that each cuff's second end is pulled away from the cuff's respective first end. Substantial rotational force may have to be exerted upon the collar depending upon the amount of mechanical spring force exerted by each of the cuffs during rotation. Once the collar has been rotated to the point that the cuffs are flat against the pipe's exterior wall, the collar is locked in place by a lock, thereby storing substantial mechanical spring energy in the cuffs which are attempting to expand back to their prior arcuate loop shape.

The collar may be locked in place utilizing various locks that can be developed by those skilled in the art. For example, the collar can be simply affixed in place utilizing one or more bolts which can be removed by motors or pyrotechnic bolt cutters. Alternatively, the collar can be affixed to the pipe utilizing a meltable solder. Once the centralizer has been positioned downhole, heat can be introduced to the centralizer such as by the introduction of hot fluid, such as a hot mud slurry, into the pipe bore, or by utilizing an induction heater positioned interior to the pipe adjacent to the centralizer. Heat is introduced until the solder has reached the temperature upon which it starts to melt and the load exerted by the cuffs is sufficient to overcome the solder's adherence, and the collar rotates and the cuffs radially expand.

In an alternative embodiment, the collar includes a notch, and a pin is positioned within the notch so as to prevent rotation of the collar until the pin has been retracted. Again, retraction of the pin can be affected by various constructions as can be determined by those skilled in the art such as by using servo-motors. Alternatively, the pin may be soldered in place. The pin is biased to retract such as by utilizing a spring or force exerted by the collar so that melting of the solder causes the pin to retract and the collar to rotate. Again, melting of the solder can be accomplished utilizing heated fluid or an induction heater within the pipe's central conduit.

As would be appreciated by those skilled in the art, embodiments of centralizers described herein may require an actuator for selectively unlocking the lock, which as described above may include a retractable pin or solder. For example, the actuator may simply be the introduction of heat such as by heated fluid or an induction heater as described above. In alternative embodiments, the actuator may comprise a timer connected to the lock for selectively unlocking the lock. For example, the centralizer may include a timer, heater and power source adjacent to a solder lock. Once the centralizer has been positioned downhole, the timer can trigger the power source to provide heat to the solder causing the solder to melt, collar to rotate, and cuffs to expand. Alternatively, the timer and power source may be connected to an electric motor, bolt cutter or other apparatus for unlocking the lock and allowing the collar to rotate.

In still an additional embodiment, the centralizer's actuator includes a receiver for receiving a signal downhole. The receiver may be constructed to receive radio frequency ("RF") signals or acoustic signals which are transmitted by a transmitter located above ground. Alternatively, the signal may be an electrical signal transmitted from above ground through electrically conductive metal casing to the centralizer downhole. Upon receipt of the desired signal, which may be coded to prevent inadvertent deployment, the receiver causes the lock to unlock. For example, where the collar is locked by meltable solder, the receiver may be connected to a heater and power supply. Upon detection of a signal downhole, the receiver activates the heater so as to melt the solder and cause the collar to rotate. Again, the receiver may be connected to other constructions such as servo-motors, bolt cutters or the like for causing the lock to unlock to permit rotation of the collar. Furthermore, the actuator may include a computer processor connected to the signal receiver for determining when the lock should be unlocked. For example, the processor may analyze the signal to determine if it is valid or to determine whether other conditions have been met to permit deployment, such as whether the centralizer has been properly positioned downhole.

In still an additional embodiment, the actuator includes a strain gauge affixed to the centralizer or affixed directly to the pipe for determining whether the pipe has deformed such as by an increase in pressure within the pipe. The actuator further includes a processor and power source connected to the strain gauge. The processor analyzes deformation of the pipe, as measured by the strain gauge, such that a predetermined deformation triggers the actuator to unlock the lock restraining the cuffs. For example, once the pipe has been transported downhole, it is common for well builders to pressurize the pipe, such as to 5,000 PSI, to ensure pipe integrity. The pressurizing of the pipe causes deformation of the pipe which can be measured by traditional strain gauges. The processor can actuate release of the cuffs upon the pipe being pressurized above a certain pressure threshold. Alternatively, the processor may unlock the lock so as to release the cuffs only after receipt of a series of pressure pulses introduced into the pipe bore so as to provide additional protection against inadvertent deployment. The strain gauge and processor may be connected to various means for unlocking the lock as described above, such as including a heater for melting solder, or motors, or bolt cutters for disengaging a bolt.

Still an additional embodiment of the actuator described herein utilizes the introduction of high pressure into the pipe after the pipe has been transported downhole so as to allow radial expansion of the cuffs. For this embodiment, the collar includes a notch. Once the collar has been rotated so as to retract the cuffs, the centralizer lock includes a retractable pin which is positioned within the notch so as to prevent the collar from rotating until the pin has been retracted. The pin is biased to retract such as by a spring or by the collar having a shoulder attempting to push the pin into a refracted condition. However, the pin is constrained from retracting by a ring which circumferentially surrounds the pipe adjacent to the collar in a manner so as to engage the pin. The ring includes a recess and the ring is rotatable from a first position wherein the recess does not receive the pin to a second position wherein the ring recess does receive the pin. The rotation and alignment of the recess to accept or not accept the pin can be accomplished by utilizing various constructions known to those skilled in the art including the use of servo-motors, springs coupled with bolt cutters, etc. For example, the actuator may include a strain gauge or signal receiver for receiving a pressure pulse, RF or acoustic signal coupled to a power servo-motor so as to cause the ring to rotate to align the recess with the retractable pin thereby causing the pin to retract and cuffs to expand. However in the preferred embodiment that utilizes pressure actuation, the actuator includes a strap which at least partially circumferentially surrounds the pipe. Preferably, the strap is wrapped between one and two times around the pipe. The strap has a first end affixed to the pipe and a second end affixed to the ring. As would be understood by those skilled in the art, expansion of the pipe would cause the strap to tighten around the pipe to place the strap in tension and thereby pull and rotate the ring in a first direction. Meanwhile, the ring is positioned such that upon the strap pulling the ring in the first direction by a predetermined distance will cause the ring recess to align with the pin so as to allow the pin to retract from the collar's notch.

Preferably, the actuator includes a plurality of ratcheting teeth positioned to project into indents formed into the ring. The teeth are angled and biased so as to allow the ring so as to rotate only in the first direction so that upon an increase in pressure within the pipe, the pipe rotates in the first direction, but a subsequent decrease in pressure within the pipe does not cause the ring to rotate in the opposite direction. Moreover, the actuator includes a spring to maintain the strap in tension even if the pipe interior pressure is decreased. This construction allows one to pressure pulse the interior of the pipe (including an increase in pressure and decrease in pressure) to incrementally rotate the ring about the pipe until rotationally aligning the pin with the ring's recess so as to allow the pin to retract from the collar's notch so as to allow the cuffs to expand. Advantageously, this embodiment does not require a downhole power supply.

Embodiments of centralizers described herein preferably have minimal and a relatively smooth cross-section prior to being transported downhole so as to substantially reduce any friction that the pipe encounters as it is transported downhole as compared to prior art centralizers. The cross section also preferably incorporates a profile to prevent the rotating collar from coming into contact with the formation in order to minimize the frictional forces acting against the rotation of the ring Advantageously, combining the force of the cuffs together provides a substantial increase in centralizing force as compared to prior art centralizers.

An additional advantage is that the improved centralizer aligns the cuff loops with the flow of cement so as to minimize the impedance of cement flow as it is pumped downhole.

Still an additional advantage is that the centralizer can be manufactured and installed relatively inexpensively with little training required for well personnel.

Other features and advantages of embodiments described herein will be appreciated by those skilled in the art upon reading the detailed description which follows with reference to the attached drawings.

BRIEF DESCRIPTION OF THE DRAWINGS

FIG. 5A is a perspective view of the cuff centralizer illustrated in FIG. 4A wherein the centralizer has deployed;

FIG. 5B is a cutaway view of the lock and actuator illustrated in FIG. 5A;

FIG. 9C are bottom cutaway plan views illustrating the cuff centralizer in a wellbore in retracted and expanded conditions.

DETAILED DESCRIPTION OF THE PREFERRED EMBODIMENTS

Figure 1:
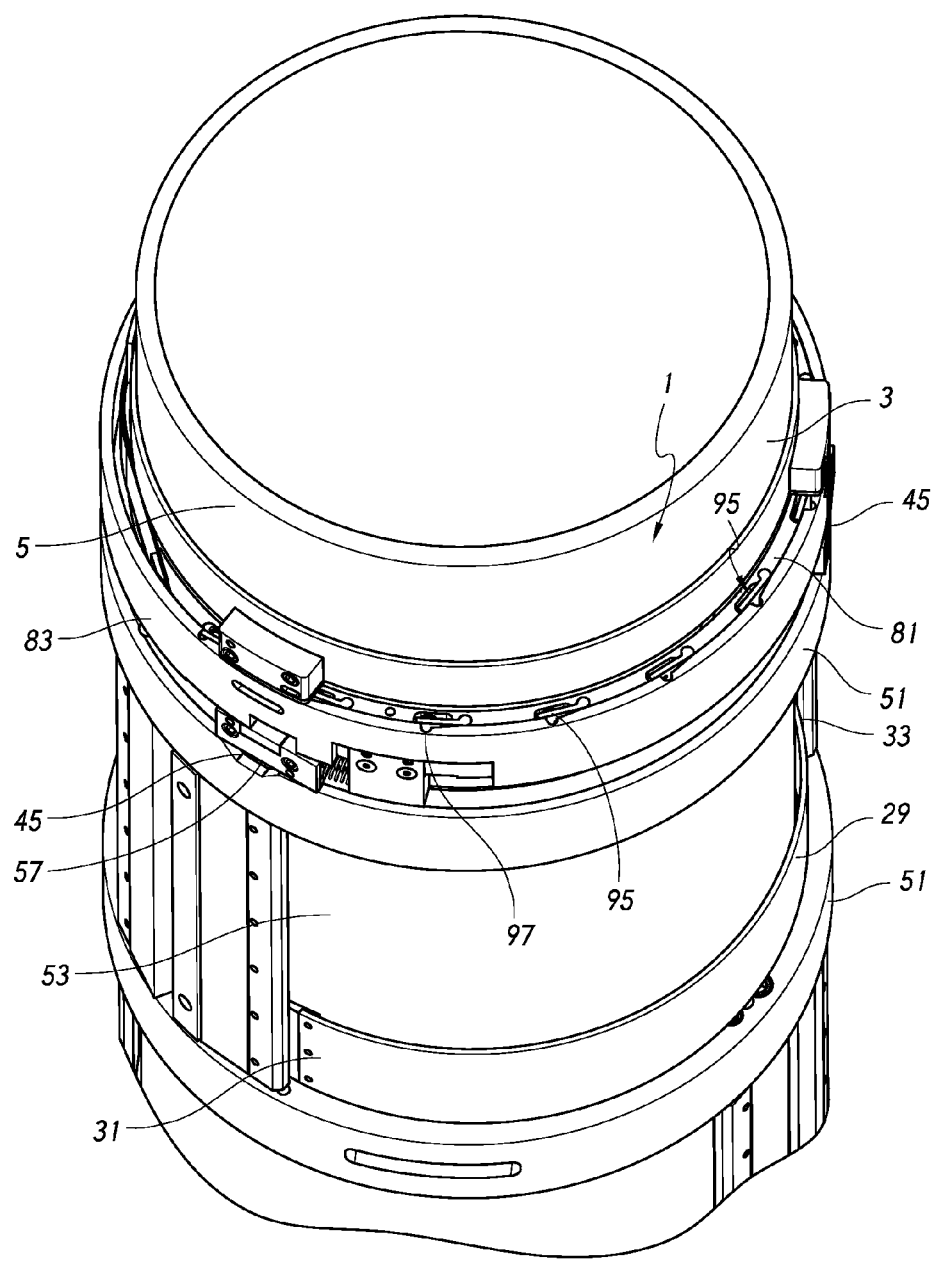
FIG. 1 is a top perspective view of a first embodiment of a cuff centralizer in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims will be made for purposes of clarity, with "up", "upper", "upwardly" or "upstream" meaning toward the surface of the borehole and with "down", "lower", "downwardly" or "downstream" meaning toward the terminal end of the borehole, regardless of the borehole orientation. As used herein, the term "pipe" is intended to be interpreted in the traditional sense as a cylindrical structure having an exterior wall and a central conduit. Furthermore, the term "pipe" is intended to include traditional well casings, casing strings, and casing couplers which connect casings to form a casing string.

Figure 3A:
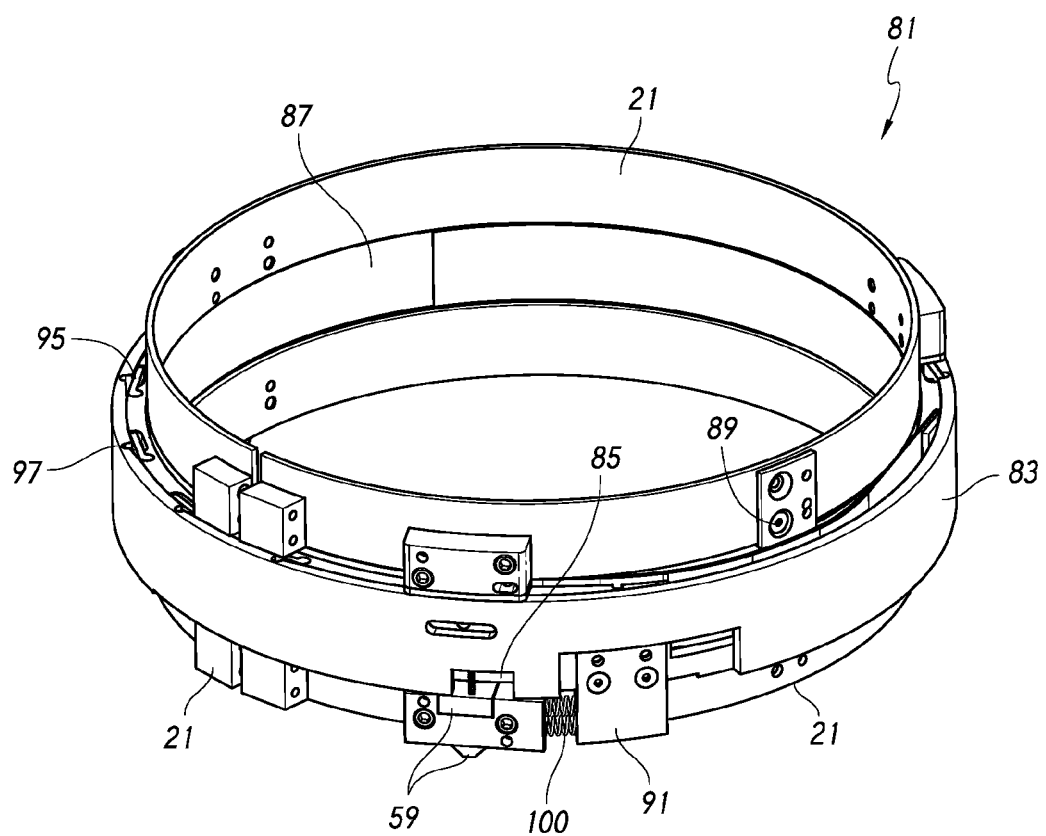
FIG. 3A is a perspective view of the actuator system for use with the cuff centralizer illustrated in FIGS. 1 and 2A-2C.
Figure 3B:
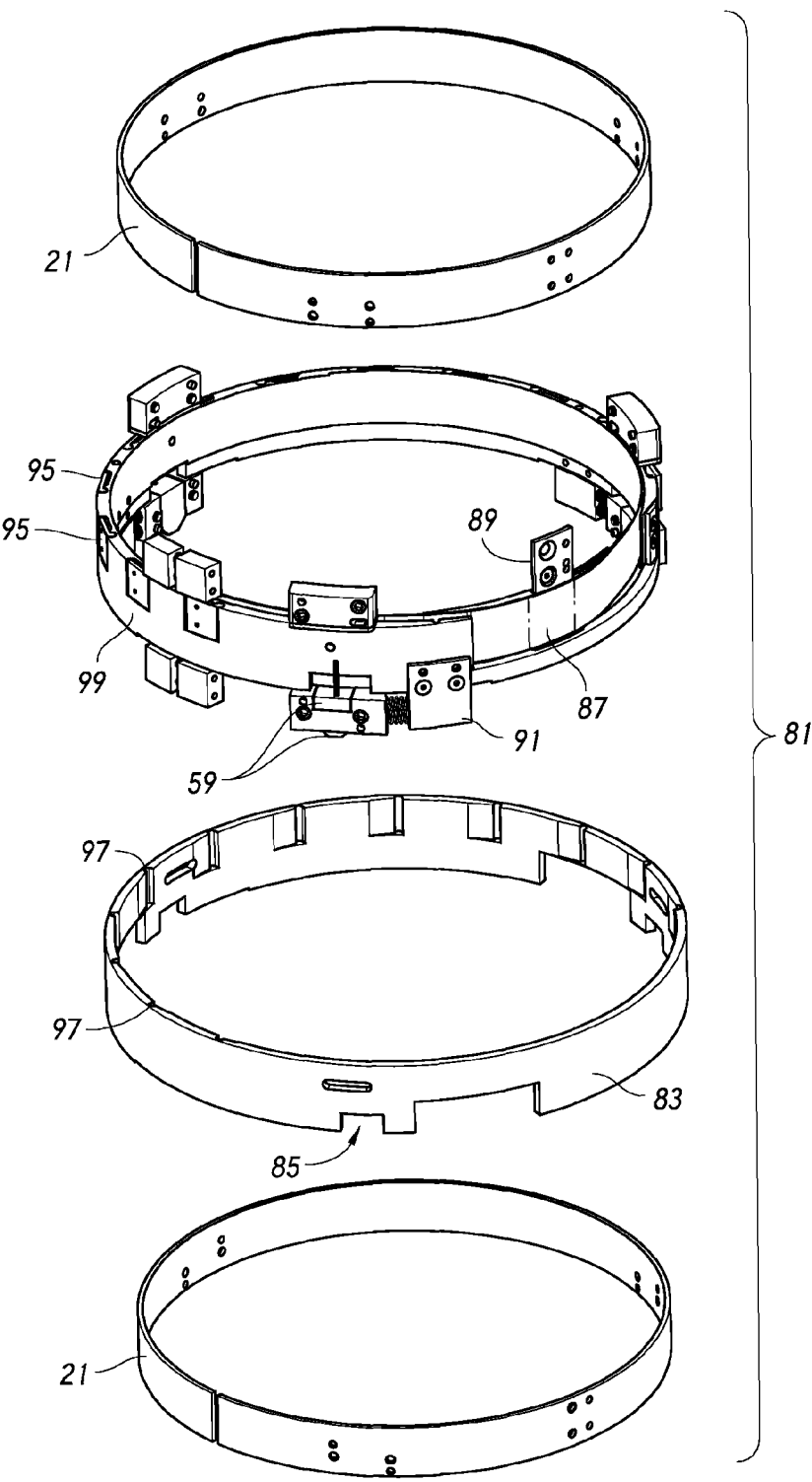
FIG. 3B is an exploded perspective view of the actuator illustrated in FIG. 3A.

With reference to the figures and particularly FIG. 9C, an embodiment of a centralizer 1 in accordance with the principles described herein is shown. Centralizer 1 is intended for centralizing a pipe 3 having a cylindrical exterior wall 5 and central conduit 7 within a wellbore 13. The centralizer 1 may be permanently affixed and integrated into the exterior of the pipe, such as for use as a pipe coupling for connecting various lengths of pipe, commonly referred to as casings, together. Alternatively, as best illustrated in FIGS. 3A and 3B, the centralizer 1 may include one or more clamp bands 21 for affixing the various centralizer components to a pipe 3 either prior to shipment to a well or immediately prior to a pipe being transported downhole into a well. As illustrated in FIGS. 3A and 3B, the clamp bands 21 form a generally circular shape and can be affixed to a pipe utilizing well known fastener constructions such as threaded fasteners for preventing the band for rotating about the pipe.

Figure 7A:
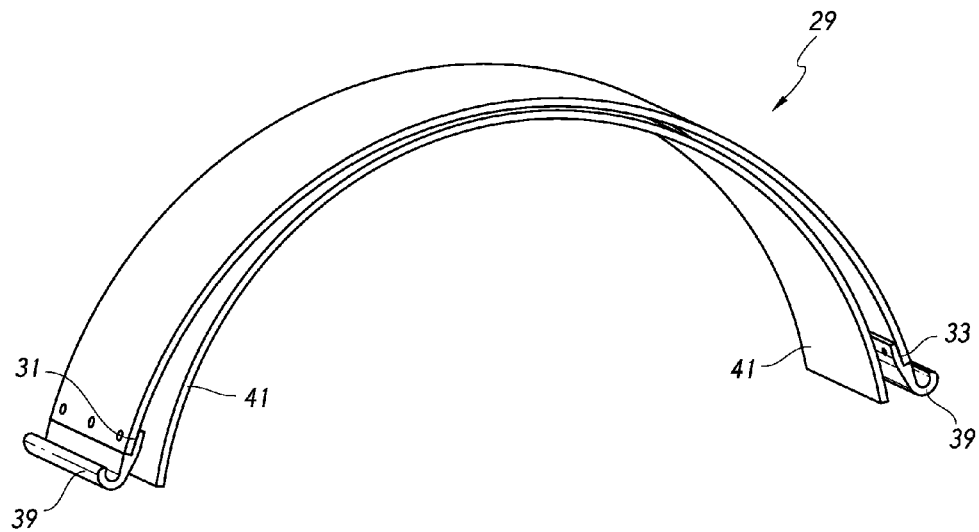
FIG. 7A is a perspective view of a first embodiment of a cuff in accordance with the principles described herein for use with a centralizer in a retracted condition.
Figure 7B:
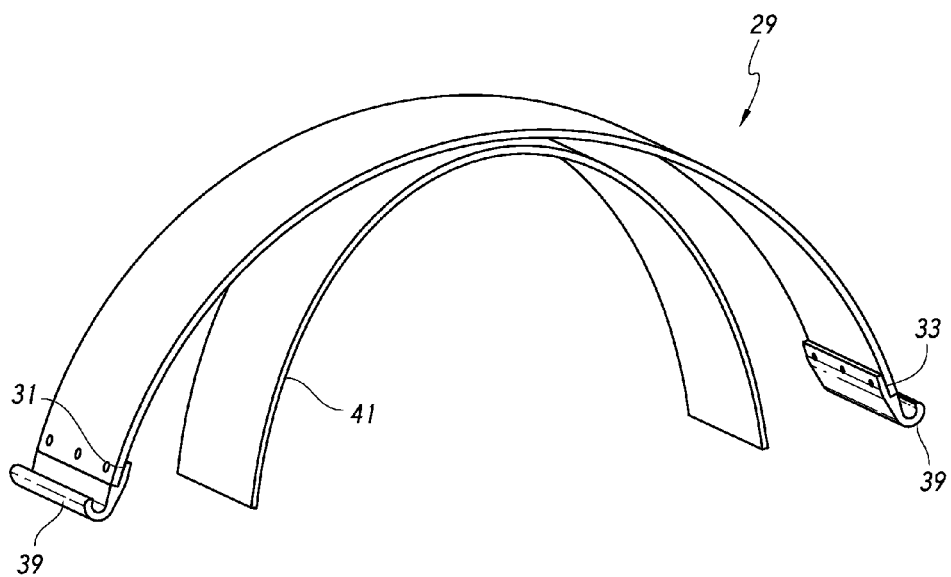
FIG. 7B is a perspective view of the cuff shown in FIG. 7A illustrated in an expanded condition.
Figure 8:
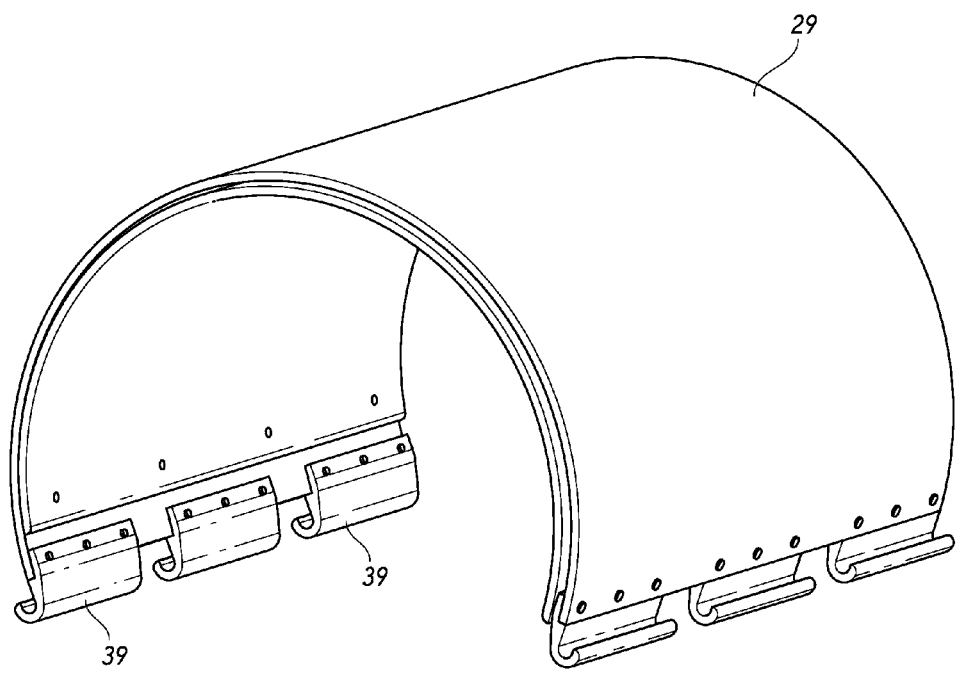
FIG. 8 is a second embodiment of a cuff in accordance with the principles described herein for use with a centralizer including multiple layers of material.

The centralizer 1 includes a plurality of cuffs 29. As illustrated in FIGS. 7A, 7B and 8, the cuffs are elongate, arcuate and have first and second ends, 31 and 33 respectively. The cuffs operate in a similar manner to leaf springs, and thus are preferably made of a traditional metal for storing mechanical spring energy, such as spring steel. The cuffs may incorporate various alloys or have a protective coating to protect them against environmental conditions.

Figure 9A:
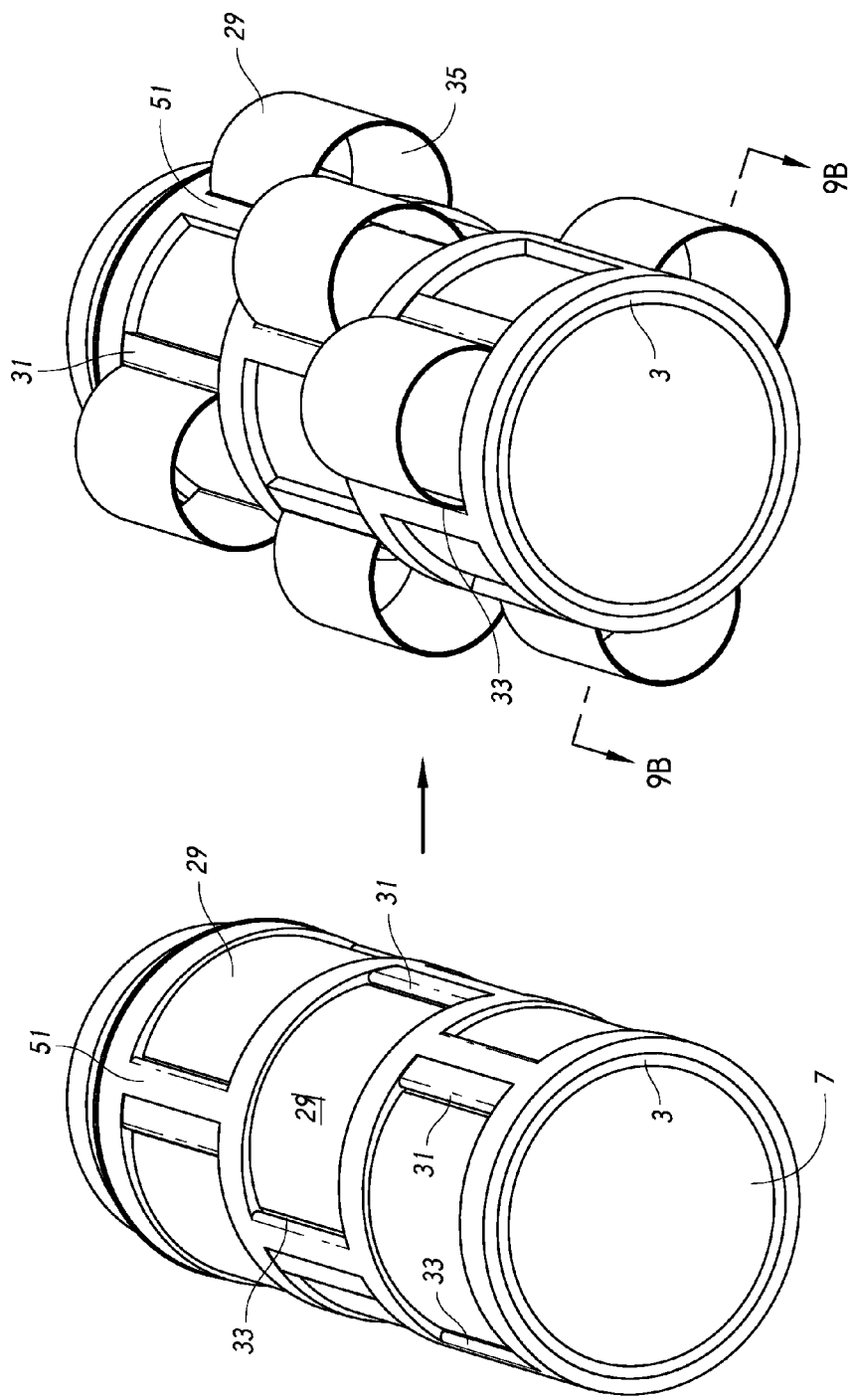
FIG. 9A includes perspective views illustrating the cuff centralizers in retracted and expanded conditions.
Figure 9B:
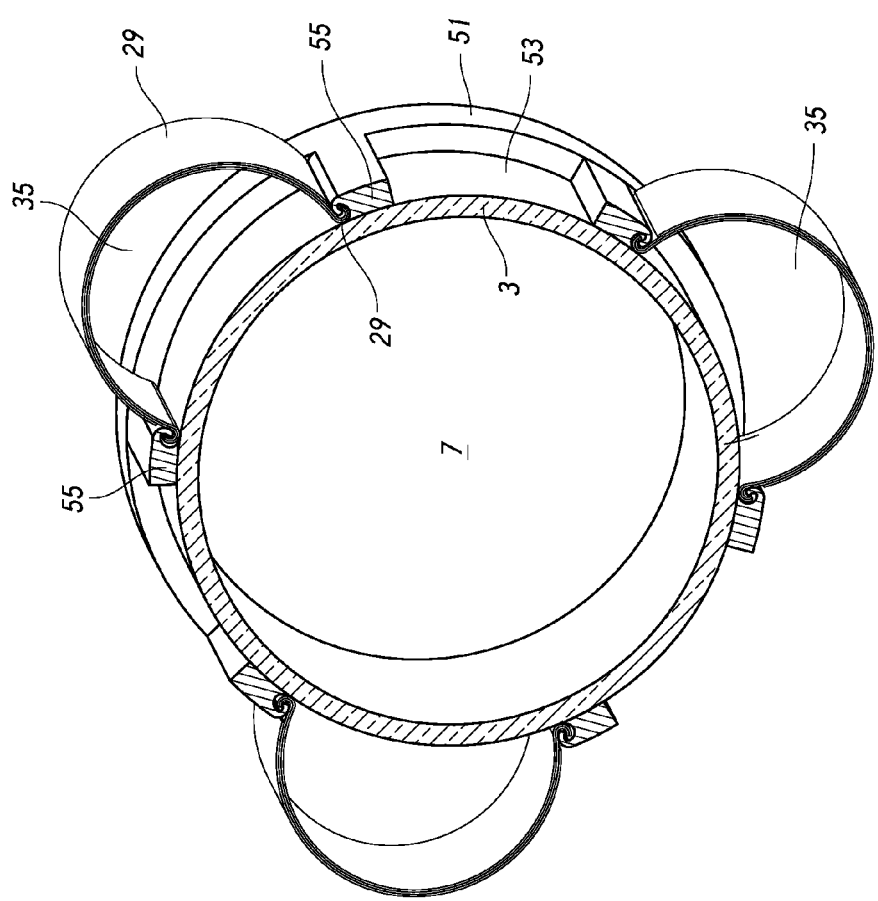
FIG. 9B is a side cutaway view of a cuff centralizer in accordance with the principles described herein illustrating how the cuffs affix to a well pipe and rotating collar.

As illustrated in FIGS. 9A-9C, each cuff's first end 31 and second end 33 is affixed adjacent to the pipe's cylindrical exterior wall 7. The cuffs 29 can be compressed radially inward into a first condition so as to be substantially flat against the pipe's exterior wall and locked in place. Alternatively, each of the cuffs 29 can be expanded radially outward to form a loop 35 wherein each cuff's first end 31 and second end 33 have been allowed to constrict together. Since the cuffs are constructed as leaf springs attempting to form a loop construction, each of the cuffs store mechanical spring energy when positioned so as to be in the radially retracted condition flat against the pipe exterior sidewall. As illustrated in FIGS. 4 and 5, the cuffs 29 are arranged about the pipe 3 so that the cuffs' loops 35 define a central axis 37 which is parallel to the pipe's longitudinal axis 9.

Preferably the centralizer cuffs 29 are connected together so as to be radially compressed together and radially expanded together. To this end, preferably the centralizer 1 includes a collar 51. For this embodiment, each of the cuffs' first ends 31 are affixed to the pipe so as to be prevented from rotating relative to the pipe. Meanwhile, the collar 51 has a hollow cylindrical structure having an inner diameter larger than the outer diameter of the pipe 3 so as to circumferentially surround the pipe and be capable of rotation about the pipe. The collar 51 affixes to each of the cuffs' second ends 33 so that rotation of the collar 51 causes each of the cuffs' second ends 33 to rotate about the pipe adjacent to the pipe's exterior sidewall 5. The collar 51 includes sidewall openings 53 allowing each of the cuffs 29 to expand radially outward through the collar 51.

As best illustrated in FIG. 9A, the centralizer 1 may include several longitudinal tiers of cuffs 29 which are capable of contracting and expanding through multiple longitudinal tiers of openings 53 formed in the collar 51. In a first rotational position relative to the pipe 3, the collar 51 extends each of the cuffs' first ends 31 away from the cuffs' second ends 33 so as to flatten the cuffs against the pipe's exterior wall 5. Rotating the collar 51 to a second position, wherein the cuffs' first and second ends have been contracted together, causes the cuffs to expand radially outward to form loops 35. The cuffs' first ends 31 can be affixed to the pipe 3 and the cuffs' second ends can be affixed to the collar 51 utilizing various fasteners known to those skilled in the art. As illustrated in FIGS. 7A, 7B, 8 and 9B, in a preferred embodiment the pipe 3 and collar 51 include flanges 55 for affixing to flanges 39 formed into the first and second ends of the cuffs 29.

The centralizer 1 includes a lock 45 for locking the cuffs in a retracted condition, and an actuator 81 for selectively unlocking the lock only after a pipe has been transported downhole into a well so as to allow the cuffs to expand radially outward. FIGS. 1-4 illustrate a first preferred embodiment of a lock 45 and actuator 81 for use with the centralizer 1 described herein. The lock includes a notch 57 formed into the collar 51. Furthermore, the lock 45 includes a retractable pin 59 capable of extending into the notch 37 for preventing rotation of the collar 51 around the pipe 3. As illustrated in FIGS. 3A and 3B, the pin 59 is prevented from rotating about the pipe 3 by a housing and clamp band 21. Meanwhile, the actuator 81 includes a ring 83 having a ring recess 85. The ring has an inner diameter larger than the outer diameter of the pipe 3 so as to receive and rotate about the pipe so that the ring recess 85 may be rotated from a first position wherein the recess does not align with the pin 59 and the ring prevents retraction of the pin from the collar's notch 57. However, as illustrated in FIGS. 2A-2C, the ring 83 may be rotated in the direction 93 so as to align the ring's recess 85 with the retractable pin 59. The pin may be biased to retract into the ring recess 85 utilizing a spring or the like. However, it is preferred that the pin 59 simply include a tapered end which engages the collar notch's shoulder 63. Since the collar is biased to rotate in the first direction 93 by the spring energy within the cuffs 29, the notch's shoulder 63 will force the pin to retract into the ring's recess 85 when properly aligned.

To rotate the ring, in the embodiment illustrated in FIGS. 1-4, the actuator 81 includes a strap 87 and a ratchet assembly including teeth 95 and indents 97. A first end 89 of a strap is affixed to the pipe 3. As illustrated in FIGS. 3A and 3B, the strap's first end may be affixed to the pipe utilizing a tab 89 affixed to clamp band 21 which in turn affixes to the pipe 3. Meanwhile, the strap's second end 91 affixes to a toothed assembly 99 having a plurality of teeth 95 which are capable of rotating in an oscillating manner about the pipe 3. Preferably, the tooth assembly 99 is circular so as to circumferentially surround and rotate about the pipe. The tooth assembly 99 may include any number of teeth as can be determined by those skilled in the art. Meanwhile, the ring 83 includes a plurality of indents 97 positioned so that as the tooth assembly 99 is rotated in the direction 93, the teeth 95 engage one or more of the ring indents 97 so as to cause the ring to rotate.

Figure 2A:
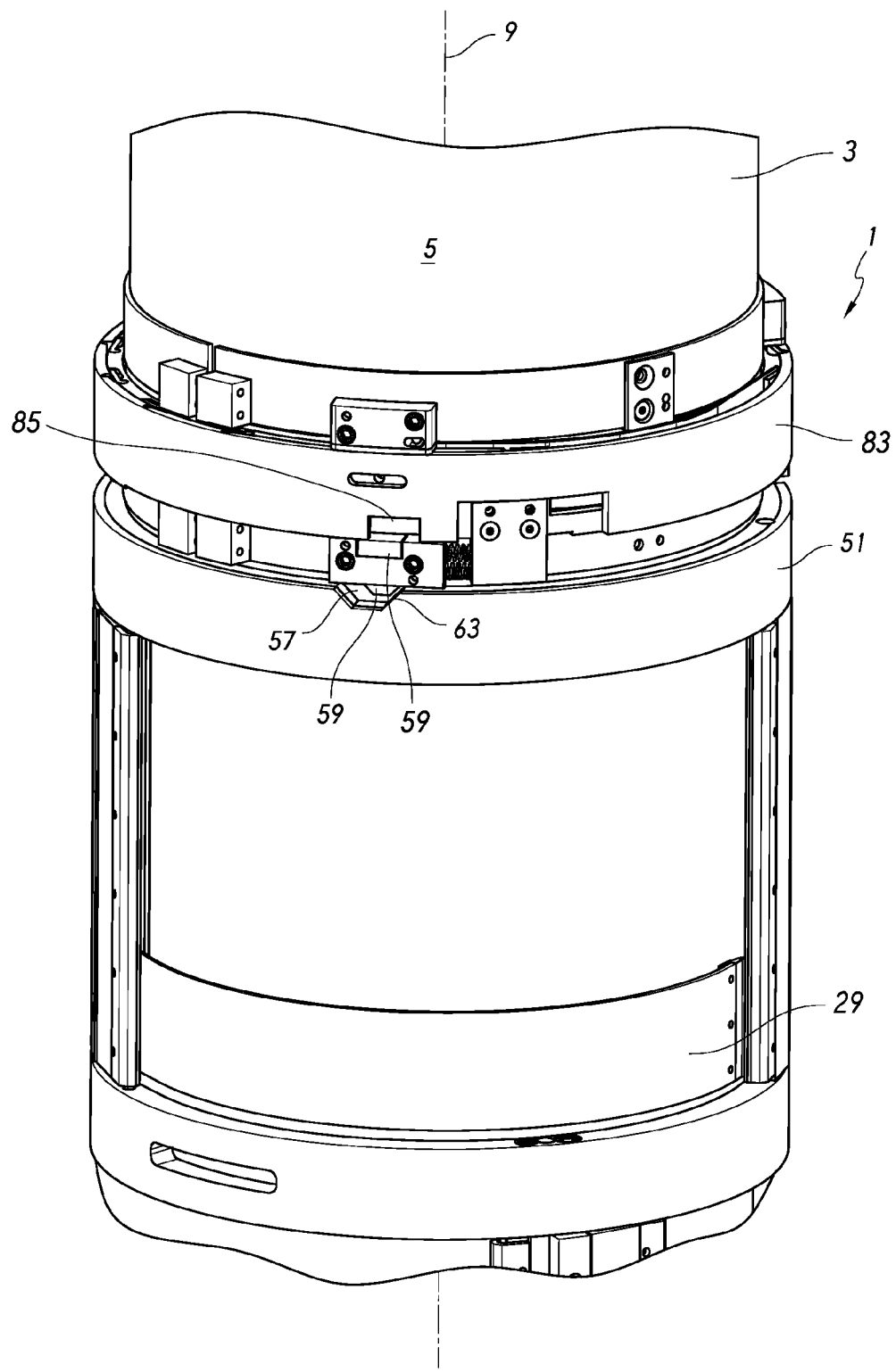
FIGS. 2A-2C are perspective views of the cuff centralizer shown in FIG. 1 illustrating the operation of the actuator system.
Figure 2B:
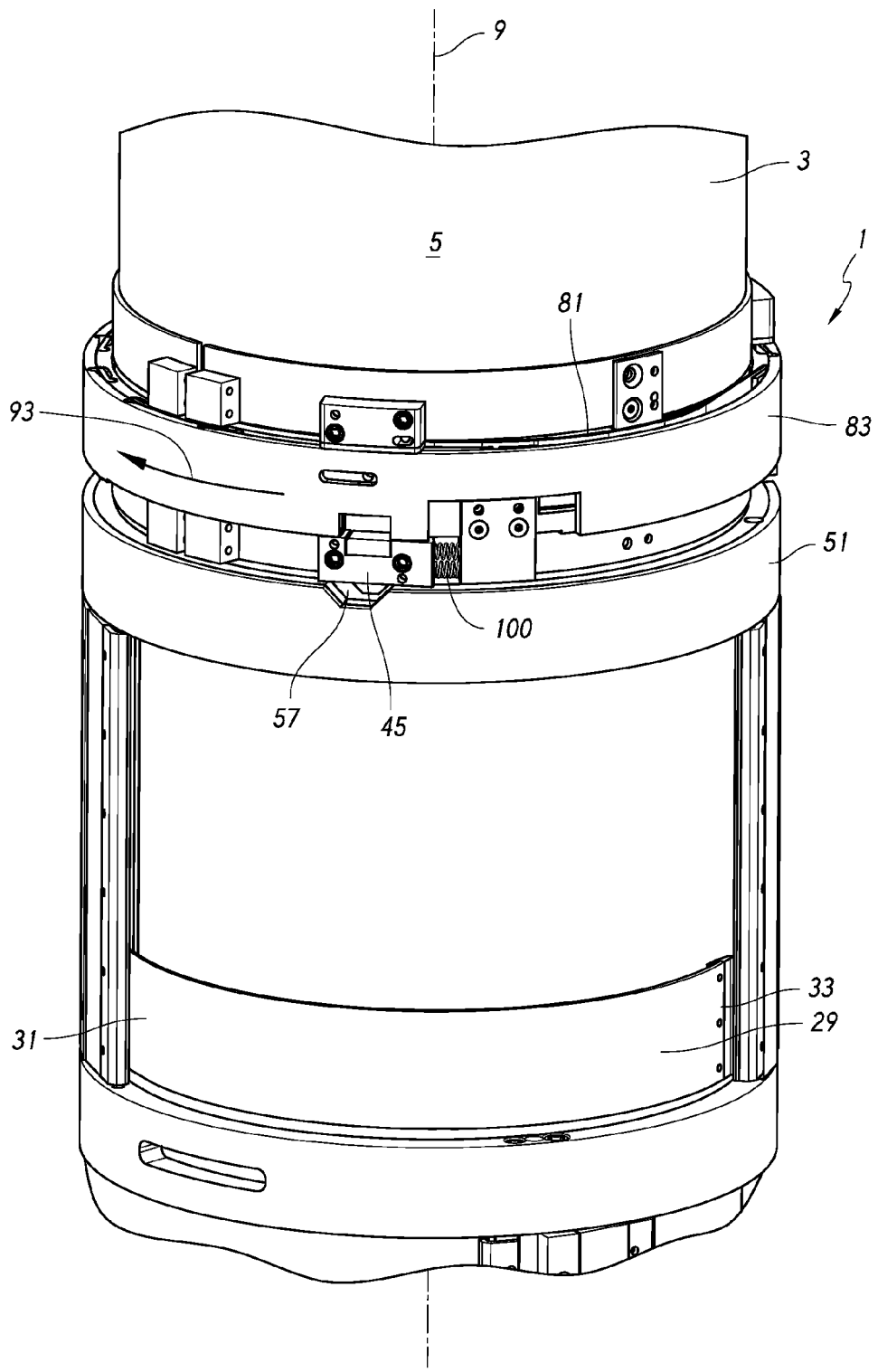
Figure 2C:
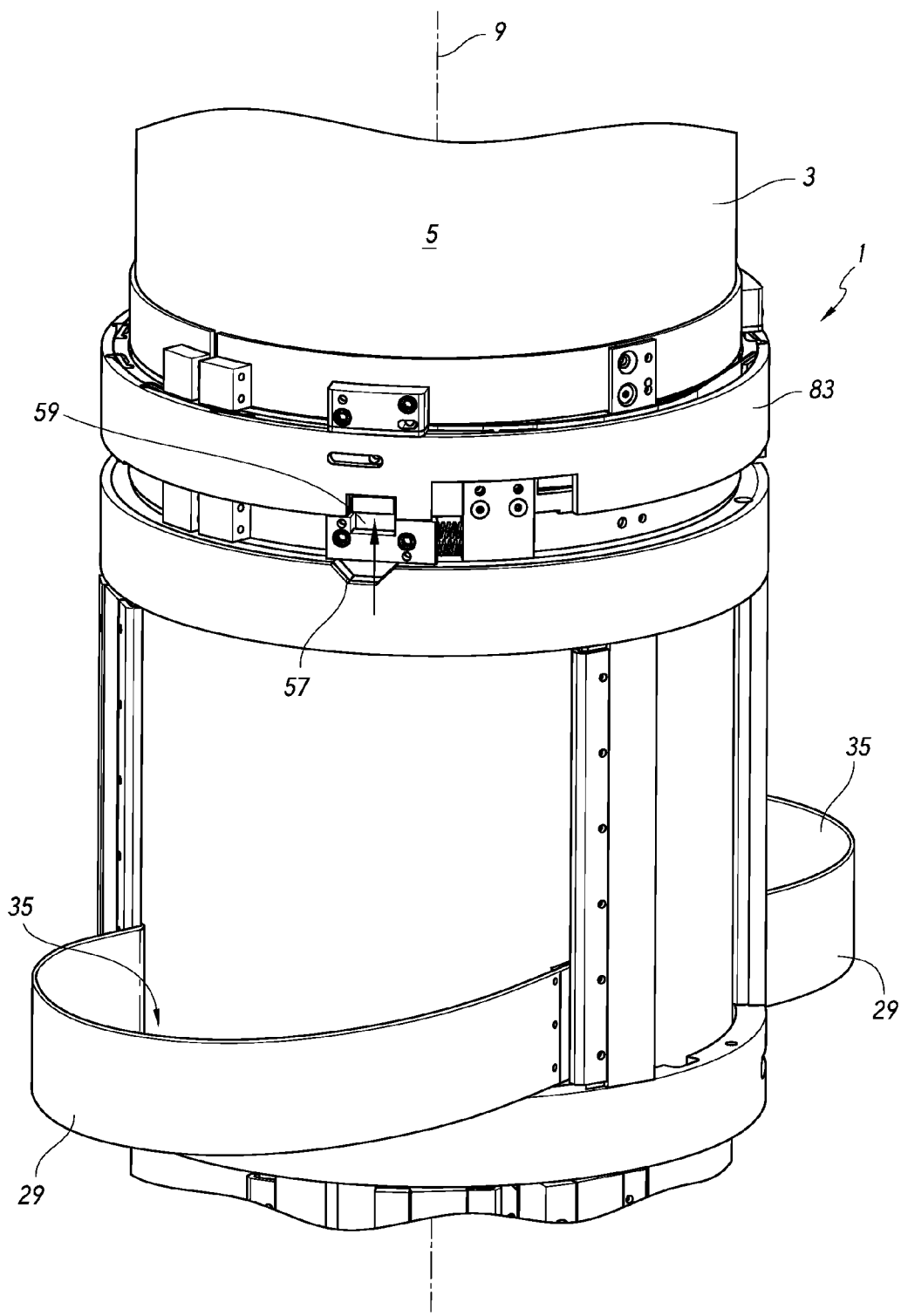

The lock 45 and actuator 81 illustrated in FIGS. 1-3 are operated by pressure pulsing pipe 5, such as by cyclically pressurizing the pipe to 2500 PSI or above which can be determined depending on the thickness of the pipe 3 and other factors. With each pressure pulse, the actuator's strap 87 is placed in tension. Because the strap's first end 89 is affixed to the pipe 3, the strap's second end 91 is made to rotate in the direction 93. This causes the strap to pull the tooth assembly 99 in the same direction 93 causing the teeth 95 to engage indents 97 to thereby rotate ring 83 in direction 93. As the pipe is depressurized, the ring 83 maintains its relative rotation relative the pipe 5. However, the strap 87 is pulled back into place by spring 100. As the strap's second end 91 is pulled, the tooth assembly 99 is rotated in the opposite direction so that teeth 95 are moved to engage new indents 97. This process is repeated, thereby rotationally oscillating the tooth assembly 99 until the ring 83 has rotated so as to align the ring recess 85 so as to receive pin 59. Once aligned, the pin is retracted into notch 57 allowing the collar 51 to rotate and the cuffs 29 to expand.

Figures 4A, 4B:
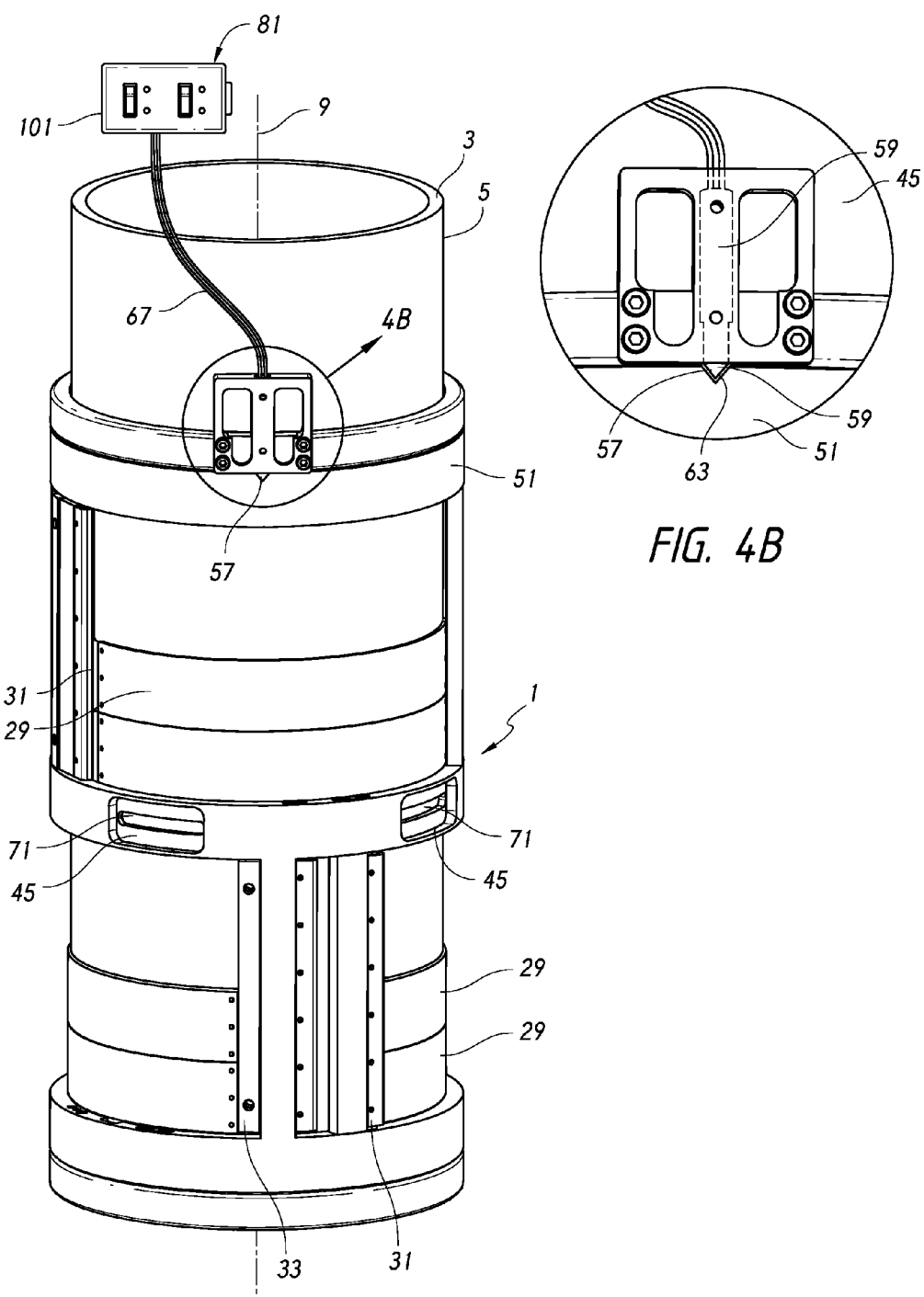
FIG. 4A is a perspective view of a second embodiment of a cuff centralizer in accordance with the principles described herein wherein the cuffs are retracted.
FIG. 4B is a cutaway view of the lock and actuator illustrated in FIG. 4A.
Figure 6A:
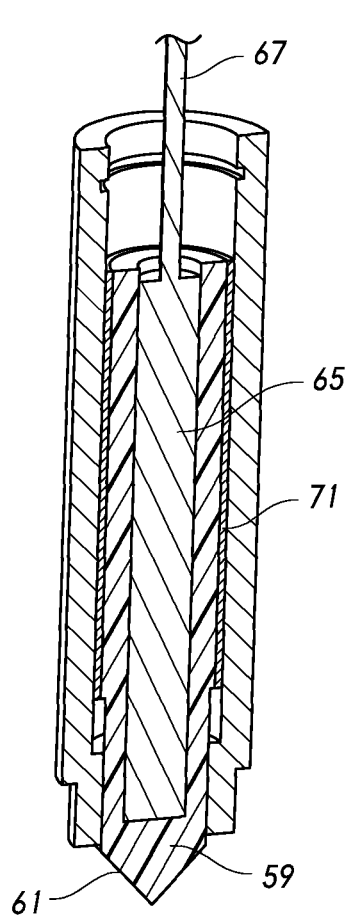
FIG. 6A is cutaway view of a lock embodiment including a soldered pin.
Figure 6B:
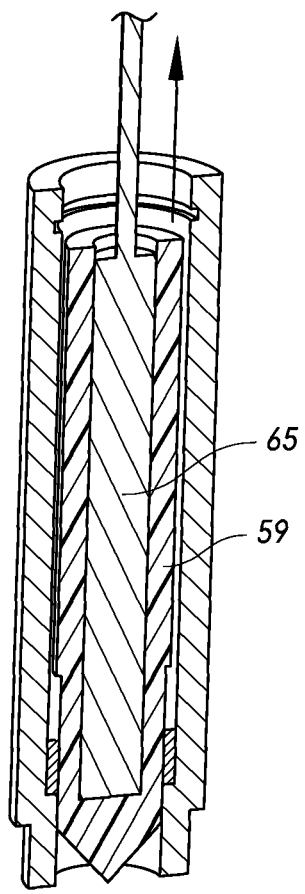
FIG. 6B is a cutaway view of the pin illustrated in FIG. 6A wherein the solder has been melted and the pin has retracted.

Still additional embodiments of the centralizer lock and actuator are illustrated in FIGS. 4-6. As illustrated, the centralizer 1 includes two lock assemblies 45 requiring two actuators 81. The two locks and actuators are provided for redundancy. However, as would be understood by those skilled in art, a centralizer 1 as described herein may include only one set of these locks and actuators. A first lock simply comprises solder 71 for maintaining the collar 51 in a first rotational position wherein the cuffs' first and second ends, 31 and 33, have been pulled apart so as to stretch the cuffs 29 so as to be retracted substantially flat against the pipe's exterior wall 5. (See FIG. 4A). The collar may be soldered directly to the pipe. Alternatively, the actuator may include one or more brake shoes (not shown) which are soldered to the pipe to restrict the collar from rotating. Only after the centralizer 1 has been positioned downhole, heat is introduced into the pipe's central conduit 7 adjacent to the centralizer so as to melt the solder and allow the collar to rotate. Heat may be introduced in any manner known to those skilled in the art such as by the pumping of hot water, the pumping of a hot mud slurry, an induction heater or electrically wound coil heater introduced downhole. Once the solder has melted, the mechanical spring energy stored in cuffs 29 causes the collar 51 to rotate, and the cuffs to radially expand outward to form loops 35, each having a central axis 37 parallel to the pipe's longitudinal axis 9. (See FIG. 5A).

As also illustrated in FIGS. 4-5, the collar may be locked in the first rotational position by a retractable pin 59 projecting into a notch 57 formed in the collar 51. As illustrated in FIG. 4B, the pin 59 preferably has a tapered end 61 which engages the notch's shoulder 63. Due to their tapered shape, the collar attempts to bias the pin to retract. However, the pin is locked in place by solder 71 (See FIG. 6A). Preferably the pin 59 includes a central heating element 65 which upon activation causes the solder 71 to melt. Once the solder has melted, the pin 59 is able to retract to allow the cuffs 29 to expand. (See FIGS. 5A and 5B).

As illustrated in FIGS. 4-5, electricity to the heating element 65 is preferably provided by an electronics package 101 located downhole with a centralizer. The electronics package 101 is illustrated as being detached from the pipe 3 and centralizer 1. However, it is preferred that the electronics package be affixed to the pipe immediately adjacent to the retractable pin so that power can be transmitted as short a distance as possible. The electronics package 101 may include various components for receiving, analyzing and triggering the heating element 65 to melt the solder 71. The components may include one or more general purpose computer processors and power sources (such as a battery) capable of withstanding the ambient temperatures and pressures found downhole in a well. In addition, the electronics package 1 includes a receiver for receiving a signal downhole. The receiver may be constructed to receive radio signals, acoustic signals or electrical signals which are transmitted by a transmitter (not shown) located above ground. Again, various general purpose radio frequency, acoustic or electrical receivers may be selected or developed without undue experimentation by those skilled in the art. Where the receiver is constructed to receive an electrical signal, the electrical signal may be transmitted through the electrically conductive material forming the pipe 3 which is received by the electronics package 101, and analyzed and processed by a processor, which in turn causes the heater element 65 to activate upon receipt of the appropriate electrical signal. Similarly, the electronics package 101 may include a radio frequency receiver for receiving radio frequency signals or an acoustic receiver for receiving lower frequency acoustic signals. Again, the signals can be processed by the processor connected to a power supply which activates the heating element 65 to release expansion of the cuffs 29. In still an alternative embodiment, the electronics package 101 includes a general purpose strain gauge connected to a processor and power supply. The strain gauge is positioned so as to measure deformation of the collar 51 or pipe 3 caused by increased pressure within the pipe's central conduit 7. The processor is preprogrammed to trigger activation of the retractable pins' heating element 65 upon the pipe being pressurized above a predetermined pressure, such as 2,500 lbs. per sq. in., or after the pipe has been pressure pulsed in a predetermined pattern. Still additional receivers may be selected by those skilled in the art.

As illustrated in FIG. 9C, the centralizer provides a minimal and relatively smooth cross-section as it is transported downhole into a well so as to minimize friction and the resulting force that must be exerted to transport the casing downhole. However, expansion of the cuffs 29 provides substantial centralizing force so as to maintain the well pipe 3 centralized within the wellbore 13 to thereby maximize the uniformity of the annular space 17 between the casing and well sidewall 15. Also advantageously, the stored mechanical energy within each of the cuffs is combined by the collar to provide a substantial increase in centralizing force compared to a construction wherein the cuffs expand or retract independently. Finally, by aligning each cuff loop axis parallel to the pipe's longitudinal axis, one minimizes the obstruction to the flow of cement as it is pumped downhole.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A centralizer for centralizing a pipe down hole comprising:
    a length of pipe having a cylindrical exterior wall and a central conduit defining a longitudinal axis;
    a collar circumferentially surrounding said pipe and capable of rotation about said pipe wherein said collar includes a notch;
    a plurality of arcuate cuffs having first and second ends, said cuffs affixed adjacent to said pipe's exterior wall and positioned circumferentially around said pipe, said cuffs being flexible so as to be positionable in a first condition wherein said cuffs are retracted radially inward so as to be substantially flat against said pipe's exterior wall and said cuffs positionable in a second condition wherein each of said cuffs are expanded radially outward to form a loop wherein said loop has a central axis parallel to said pipe's longitudinal axis, each of said cuffs storing mechanical spring energy when positioned in said first radially retracted condition with said mechanical spring energy attempting to force said cuffs into said second radially expanded condition; a cuff first ends being affixed to said pipe and a cuff second ends being affixed to said collar so that said cuffs all expand or retract together, said collar rotation from a first position wherein said cuffs are positioned in said first condition to a second position wherein said cuffs are positioned in said second position;
    a lock selectively locking said collar into said first position wherein said arcuate cuffs are positioned in said first condition, said lock having a retractable pin which projects into said notch to prevent said collar from rotating so as to lock said collar into said first position, and said pin selectively retracting from said notch to allow said collar to rotate to said second position for causing said cuffs to expand radially from said first condition to said second condition due to the mechanical spring energy stored within said cuffs; and
    an actuator for selectively unlocking said lock to cause said cuffs to expand radially from said first condition to said second condition.

2. The centralizer for centralizing a pipe down hole of claim 1 wherein said lock includes a meltable solder affixing said pin into said notch, and melting of said solder allows said pin to retract from said notch to allow said collar to rotate to said second position.

3. The centralizer for centralizing a pipe down hole of claim 2 wherein said actuator includes:
    an electric heater for producing heat to melt said solder;
    a receiver for receiving a signal, said receiver connected to said heater for selectively activating said heater to melt said solder to cause said cuffs to expand radially from said first condition to said second condition upon receipt of said signal;
    a power source for providing power to said heater and said receiver; and
    a remote transmitter for transmitting a signal to said receiver.

4. The centralizer for centralizing a pipe down hole of claim 2 wherein said actuator includes:
    an electric heater for producing heat to melt said solder;
    a strain gauge for measuring deformation of said pipe including deformation of said pipe caused by a change of ambient pressure within said pipe;
    a processor connected to said strain gauge and said lock for selectively activating said heater to melt said solder and to cause said cuffs to expand radially from said first condition to said second condition upon said strain gauge measuring predetermined deformation of said pipe;
    a power source connected to said electric heater, said strain gauge and said processor.

5. The centralizer for centralizing a pipe down hole of claim 1 wherein said actuator includes:
    a receiver for receiving a signal for selectively unlocking said lock to cause said cuffs to expand radially from said first condition to said second condition upon receipt of said signal;
    a power source for providing power to said receiver; and
    a remote transmitter for transmitting a signal to said receiver.

6. The centralizer for centralizing a pipe down hole of claim 5 wherein said signal is a radio frequency signal and said receiver and said remote transmitter are capable of communicating acoustic signals when said receiver is positioned down hole in a well and said remote transmitter is positioned above ground.

7. The centralizer for centralizing a pipe down hole of claim 5 wherein said signal is an acoustic signal and said receiver and said remote transmitter are capable of communicating acoustic signals when said receiver is positioned down hole in a well and said remote transmitter is positioned above ground.

8. The centralizer for centralizing a pipe down hole of claim 1 wherein said actuator includes:
    a strain gauge for measuring deformation of said pipe including deformation of said pipe caused by a change of ambient pressure within said pipe;
    a processor connected to said strain gauge and said lock for selectively unlocking said lock to cause said cuffs to expand radially from said first condition to said second condition upon said strain gauge measuring predetermined deformation of said pipe;
    a power source connected to said strain gauge and said processor.

9. The centralizer for centralizing a pipe down hole of claim 1 wherein said actuator includes:
    a ring circumferentially surrounding said pipe and capable of rotation about said pipe, said ring positioned to engage and obstruct said pin from retracting from said notch when said collar is locked in said first condition and said ring including a recess capable of rotationally aligning with said pin so that said ring does not block said pin from retracting from said notch;
    a strap at least practically circumferentially surrounding said pipe, said strap having a first end affixed to said pipe and a second end affixed to said ring such that the expansion of said pipe causes said strap to be tensioned to pull said ring in a first direction about said pipe so as to rotate said ring to align said recess with said pin so that said ring does not block said pin from retracting from said notch; and
    a plurality of ratcheting teeth permitting said ring to rotate about said pipe in only the first direction such that an increase of pressure within said pipe expands said pipe so as to rotate said ring about said pipe, but the decrease in pressure within said pipe and resulting pipe contraction does not rotate said ring in an opposite direction about said pipe;

said ratcheting teeth and resulting one way rotation of said ring about said pipe allowing said pipe to experience a plurality of interior pressure pulses (including increased pressure and decreased pressure) to rotate said ring about said pipe to rotationally aligning said pin with said recess to cause said pin to retract from said notch to allow said collar to rotate to said second position for causing said cuffs to expand radially from said first radially retracted condition to said second radially expanded condition.

10. A centralizer for centralizing a pipe down hole comprising:

a band forming a hoop for circumferentially surrounding and affixing to the pipe, said hoop having a central conduit defining a longitudinal axis;

a collar circumferentially surrounding the pipe and capable of rotation about the pipe wherein said collar includes a notch;

a plurality of arcuate cuffs having first and second ends, said cuffs affixed to said band and positioned circumferentially around said band, said cuffs being flexible so as to be positionable in a first condition wherein said cuffs are retracted radially inward so as to be substantially flat against said band and the pipe's exterior wall, and said cuffs positionable in a second condition wherein each of said cuffs are expanded radially outward to form a loop wherein said loop has a central axis parallel to said band's longitudinal axis, each of said cuffs storing mechanical spring energy when positioned in said first radially retracted condition with said mechanical spring energy attempting to force said cuffs into said second radially expanded condition; a cuff first ends being affixed to said band and a cuff second ends being affixed to said collar so that said cuffs all expand or retract together, said collar rotation from a first position wherein said cuffs are positioned in said first condition to a second position wherein said cuffs are positioned in said second condition;

a lock selectively locking said collar into said first position wherein said arcuate cuffs are positioned in said first condition, said lock having a retractable pin which projects into said notch to prevent said collar from rotating so as to lock said collar into said first position, and said pin selectively retracting from said notch to allow said collar to rotate to said second position for causing said cuffs to expand radially from said first condition to said second condition due to the mechanical spring energy stored within said cuffs; and an actuator for selectively unlocking said lock to cause said cuffs to expand radially from said first condition to said second condition.

11. The centralizer for centralizing a pipe down hole of claim 10 wherein said lock includes a meltable solder affixing said pin into said notch, and melting of said solder allows said pin to retract from said notch to allow said collar to rotate to said second position.

12. The centralizer for centralizing a pipe down hole of claim 11 wherein said actuator includes:

an electric heater for producing heat to melt said solder;
a receiver for receiving a signal, said receiver connected to said heater for selectively activating said heater to melt said solder to cause said cuffs to expand radially from said first condition to said second condition upon receipt of said signal;

a power source for providing power to said heater and said receiver; and a remote transmitter for transmitting a signal to said receiver.

13. The centralizer for centralizing a pipe down hole of claim 11 wherein said actuator includes:

an electric heater for producing heat to melt said solder;
a strain gauge for measuring deformation of the pipe including deformation of the pipe caused by a change of ambient pressure within the pipe;
a processor connected to said strain gauge and said lock for selectively activating said heater to melt said solder and to cause said cuffs to expand radially from said first condition to said second condition upon said strain gauge measuring predetermined deformation of the pipe;
a power source connected to said electric heater, said strain gauge and said processor.

14. The centralizer for centralizing a pipe down hole of claim 10 wherein said actuator includes:

a receiver for receiving a signal for selectively unlocking said lock to cause said cuffs to expand radially from said first condition to said second condition upon receipt of said signal;
a power source for providing power to said receiver; and
a remote transmitter for transmitting a signal to said receiver.

15. The centralizer for centralizing a pipe down hole of claim 14 wherein said signal is a radio frequency signal and said receiver and said remote transmitter are capable of communicating acoustic signals when said receiver is positioned down hole in a well and said remote transmitter is positioned above ground.

16. The centralizer for centralizing a pipe down hole of claim 14 wherein said signal is an acoustic signal and said receiver and said remote transmitter are capable of communicating acoustic signals when said receiver is positioned down hole in a well and said remote transmitter is positioned above ground.

17. The centralizer for centralizing a pipe down hole of claim 10 wherein said actuator includes:

a strain gauge for measuring deformation of said pipe including deformation of the pipe caused by a change of ambient pressure within the pipe;
a processor connected to said strain gauge and said lock for selectively unlocking said lock to cause said cuffs to expand radially from said first condition to said second condition upon said strain gauge measuring predetermined deformation of said pipe;
a power source connected to said strain gauge and said processor.

18. The centralizer for centralizing a pipe down hole of claim 10 wherein said actuator includes:

a ring for circumferentially surrounding the pipe and capable of rotation about the pipe, said ring positioned to engage and obstruct said pin from retracting from said notch when said collar is locked in said first condition and said ring including a recess capable of rotationally aligning with said pin so that said ring does not block said pin from retracting from said notch;
a strap for at least practically circumferentially surrounding the pipe, said strap having a first end affixed to said band and a second end affixed to said ring such that the expansion of the pipe causes said strap to be tensioned to pull said ring in a first direction about the pipe so as to rotate said ring to align said recess with said pin so that said ring does not block said pin from retracting from said notch; and a plurality of ratcheting teeth permitting said ring to rotate about the pipe in only the first direction such that an increase of pressure within the pipe expands the pipe so as to rotate said ring about the pipe, but the decrease in pressure within the pipe and resulting pipe contraction does not rotate said ring in an opposite direction about the pipe;

said ratcheting teeth and resulting one way rotation of said ring about the pipe allowing the pipe to experience a plurality of interior pressure pulses (including increased pressure and decreased pressure) to rotate said ring about the pipe to rotationally aligning said pin with said recess to allow said pin to retract from said notch to allow said collar to rotate to said second position for causing said cuffs to expand radially from said first radially retracted condition to said second radially expanded condition.

\* \* \* \* \*